United States Patent Office 3,454,037
Patented July 8, 1969

3,454,037
CONTROL SYSTEM
Edward J. Grace, Ocean City, and Malcolm W. Cornforth, Beverly, N.J., assignors, by mesne assignments, to American Meter Company (Inc. 1966), Philadelphia, Pa., a corporation of Delaware
Filed Nov. 9, 1966, Ser. No. 593,080
Int. Cl. G01f 1/00, 15/00
U.S. Cl. 137—487.5                                    4 Claims

ABSTRACT OF THE DISCLOSURE

A logic circuit for operating a reversible motor in response to a pulse rate comprises a timer, which is set into operation by a first pulse to determine a pre-selected interval. If the next pulse precedes the end of the time interval, the motor is driven in a first direction throughout the interval between the second pulse and the end of the time interval. If the second pulse follows the end of the time interval, the motor is driven in the opposite direction for the interval following the end of the time interval and preceding the second pulse. The control system is particularly applicable to the regulation of fluid flow rates.

---

This invention relates to control systems and has particular reference to systems which involve the use of intervals between pulses in comparison with standard intervals to effect control action.

While the invention is more broadly applicable as will hereinafter appear, a typical use is that of flow control. In such a use a flow may be metered and, if it is too large or too small, a control valve may be closed or opened to change the flow rate to what is desired. The invention is particularly applicable to the control of low rates of flow as may be measured by volumetric meters. A meter of this type, for example, may go through a cycle in a quite extended length of time, the period being even one of a substantial number of minutes. In accordance with the invention such a meter may produce electrical pulses, one for each cycle, which cannot be handled in conventional fashions. It is simple, for example, to provide control when pulses occur at quite short intervals; these may be typically handled by converting them into pulses of equal duration and feeding the latter into integrating systems, giving rise to an average signal which is a function of pulse frequency. But when the pulse frequency is very low such a system is inapplicable.

Speaking from a very general standpoint, the system in accordance with the invention starts a particular selected time interval upon the occurrence of a pulse, the frequency corresponding to repetition of this time interval being proportional to the flow rate desired. If the rate of flow is too great the next pulse will occur prior to the end of the time interval; if the flow rate is too small the next pulse will occur after the time interval. In dependence upon the deviation from the fixed interval, control of a motor is effected to change the control valve setting. The change effective in any cycle may be small so that step by step correction of the flow rate is secured with elimination of any problems of hunting. The fixed time interval may be manually adjusted, or may be automatically adjusted in accordance with some measured variable. For example, if a desired temperature is to be maintained by control of flow to a burner, a temperature sensing device could control the fixed time interval against which comparison is made, the present system being then a device for translating the temperature measurement into a satisfactory valve control.

While reference has been made to pulses occurring at low frequency, it will become evident that the invention is equally applicable if pulses occurred at high frequency. Even though such pulses may be used for control in other fashions, the apparatus of the present invention has the advantage of simplicity, stability, and simple adjustment.

Further, while pulses produced by a meter have been and will be particularly discussed, the invention is equally applicable to control utilizing pulses from a different type of source. For example, many other types of measuring means (for temperature, pressure, resistivity, light absorption, or the like involved in processing) may be caused to produce pulses at frequency rates dependent upon a variable. Typical devices of this type may generate direct currents or voltages to control pulses produced by blocking oscillators, multivibrators, unijunction transistor circuits, or the like. The present invention is particularly adapted to the energization of a reversible motor to effect control, and since in each operation a motor desirably runs for an appreciable time, the period between pulses should substantially exceed the desired minimum time of running of the motor. If the pulses follow each other at short intervals, a pulse divider arrangement may be used to secure sufficiently spaced pulses.

The general objects of the invention relate to the attainment of the results indicated, and these and others relating to details of arrangement and operation will become more apparent from the following description, read in conjunction with the accompanying drawings in which.

Figure 1:
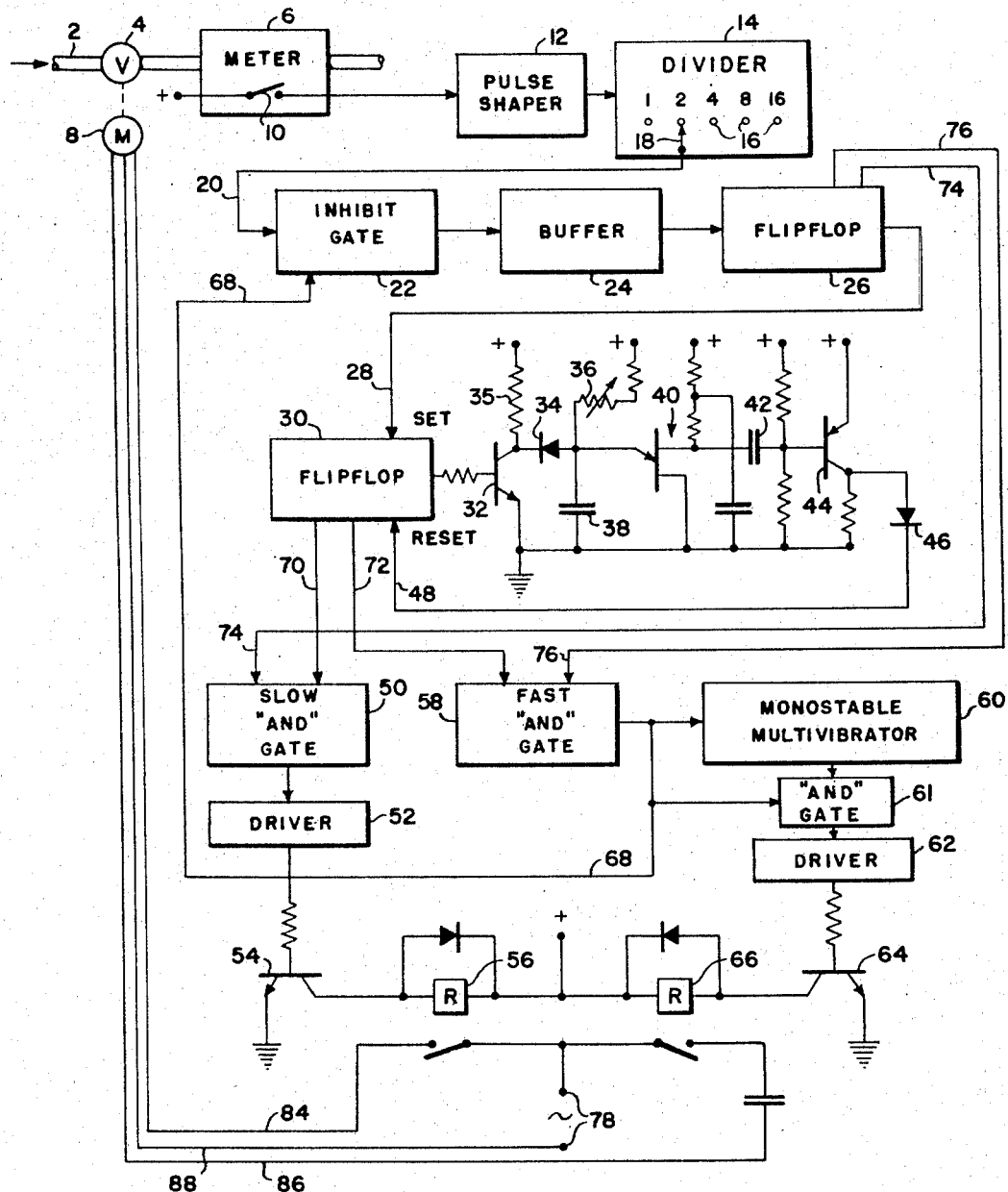
FIGURE 1 is a schematic diagram of the control system applied to fluid flow control.

Referring to FIGURE 1, there is indicated at 2 a conduit for a fluid, liquid or gas, flow which is controlled by a valve 4 while the flow is measured by a meter 6 which may be of any type suitable to the flow involved but which, for purposes of description, may be assumed to be a volumetric meter which may have a long cycle when the flow is small, the cycle possibly being minutes in length. What the control system effects is operation of the reversible motor 8 for control of the setting of the valve 4 which the motor may drive through reduction gearing either external to or forming part of the motor.

Whatever the form of the meter 6, it will operate in each of its cycles a switch 10 which in many cases may be a snap switch, such as a microswitch, operated by a cam or by limit movement of an expansible chamber of the meter, while in other cases there may be a more elaborate switch closed cyclically by a photoelectric or magnetic detecting device or the like. The durations of pulses resulting from closure of such a switch may vary greatly in duration and desirably, therefore, the repetition of a pulse controls a pulse shaper 12 which may take the form of a monostable multivibrator to produce output pulses of uniform shape. Because of the possibility that the pulses may occur at very different frequencies, they are desirably fed to a divider 14 of conventional type containing staged flipflops to provide outputs at terminals 16 which may be chosen by adjustment of a contact 18 to produce output pulses for each input pulse or for every 2, 4, 8 or 16 input pulses. If desired, the division may be carried much further. So far as the control operation is concerned, the apparatus may be regarded as receiving pulses through connection 20, and when references are hereafter made to meter pulses reference is intended to those appearing at this connection 20 which bear a definite proportional relationship to the actual pulses produced at the switch 10.

The pulses from 20 are fed to an inhibit gate of conventional type which will pass the pulses except when the gate is closed by a control signal which will be later described as appearing at the input 68. A conventional buffer stage is indicated at 24 through which the pulses are fed to a conventional flipflop 26. This, in turn, for each two input pulses provides a set pulse through connection 28 to a flipflop 30 to put it in a particular state as contrasted with a reset state into which it is thrown by a reset signal from a line 48.

When the flipflop passes to its set state it cuts off a transistor 32, whereas when it is in its reset state this transistor is conductive. The arrangement is for controlling the operation of a unijunction transistor timer, the emitter of the unijunction transistor 40 being connected between the underground terminal of capacitor 38 and the adjustable resistor arrangement 36 running to a positive supply terminal, the emitter also being connected through diode 34 to the collector of transistor 32. When the transistor 32 conducts, the emitter is effectively grounded. When the transistor is in its nonconducting state the diode 34 is blocked by the positive potential applied to its cathode through resistor 35. The RC network provided by 36 and 38 establishes a time interval which begins with the cutting off of transistor 32 and terminates with the rise of potential of the emitter to the firing potential of the unijunction transistor 40. By choosing capacitor 38 of sufficiently large size (for example 500 microfarads) and having the positive supply to the resistance arrangement 36 sufficiently greater than the firing potential of the unijunction transistor the time interval may be substantially linearly related to the resistance at 36, there being used an approximately linear portion of the exponential charging characteristic. When the unijunction transistor fires a negative signal is emitted from its upper base through capacitor 42 to render conductive a transistor 44 which is normally held nonconductive by the voltage dropping resistors connected to its base. The pulse through the capacitor 42 accordingly produces an output pulse through the diode 46 to reset connection 48.

The adjustable resistor 36 is the element which determines the normal flow rate desirably maintained through the valve and meter. This resistor may be simply a manually adjusted resistor but alternatively it may represent an adjustable resistance provided by an element controlled by some other variable on which the time interval is to depend.

"And" gate 50, controlled as hereafter described, operates a driver 52 which controls the transistor switch 54 arranged to energize the normally open contact of a relay 56. The switch 54 conducts when the gate 50 provides an output. The word "slow" applied to the gate 50 does not refer to any slow action of the gate but rather to its functional operation in the present apparatus in which it delivers a signal when the flow rate is slow, as described later.

A second "and" gate 58 is provided (designated "fast" to refer to flow which is too fast) and its output controls a monostable multivibrator 60 which typically has a monostable state lasting five seconds. During this monostable state it controls the driver 62 through "and" gate 61 to render conductive the transistor switch 64 to energize a relay 66 having a normally open contact closed by such energization. During the "and" period of 58 a signal is provided through connection 68 to close the normally open inhibit gate 22.

Returning to the operations of the flipflops 26 and 30 and the "and" gates 50 and 68, outputs from the two states of flipflop 30 are respectively provided to gates 50 and 58 through connections 70 and 72, whereas outputs are respectively provided to these gates through connections 74 and 76 from the two states of flipflop 26. As will appear hereafter, when the two flipflops 26 and 30 are in one pair of corresponding states the gate 50 will be activated to provide an output, whereas when they are in their other corresponding states the gate 58 will be activated to provide an output. For explanatory purposes the gates 50 and 58 are illustrated separately though these gates may be combined in a single unit as is well known in the art to produce one output when one pair of inputs are in correspondence and another output when a second pair of inputs are in correspondence.

Reversible motor operation is effected from the alternating supply terminals 78. When the contacts of relay 50 and 56 are open the motor phases are both deenergized and the motor 8 is stationary; when one or the other of the relay contacts is closed the motor operates and in a direction depending upon which relay is energized. This type of operation is conventional for the driving of reversible motors. The connections, of course, are so made that the motor will drive the valve 4 toward closed position when the flow is too large and toward open position when the flow is too small.

Figure 2:
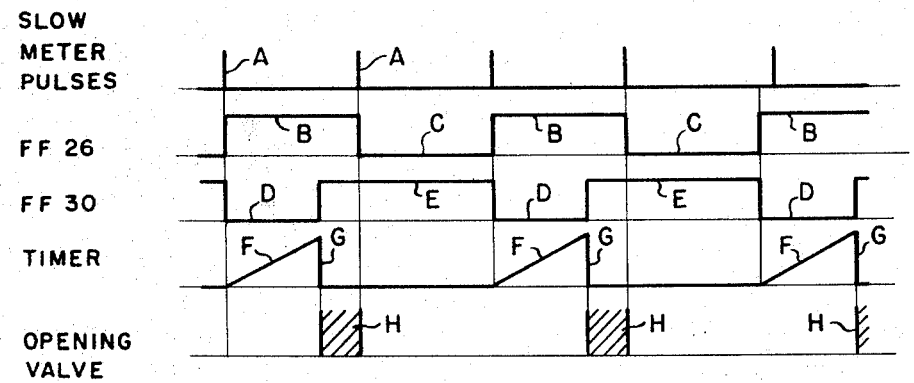
FIGURE 2 is a diagram in which various pulses are plotted against time, illustrating the type of operation involved when meter pulses are too slow.
Figure 3:
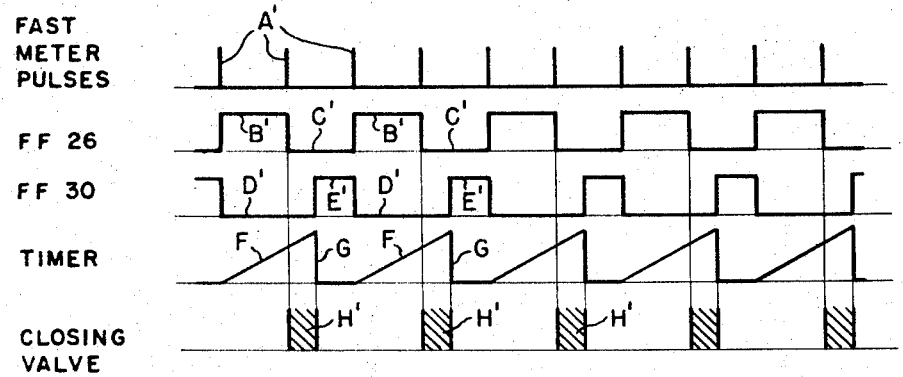
FIGURE 3 is a similar diagram applying to a situation when the meter pulses are too fast.

The operation may be best understood by considering FIGURES 2 and 3, the former of which relates to operation when flow is too small and the interval between meter pulses correspondingly too great, while the latter refers to the reverse situation. Referring first to FIGURE 2 the meter pulses are indicated at A. The flipflop 26 is controlled by these meter pulses to be thrown to its states which may arbitrarily be referred to as on and off and indicated respectively at B and C. The inhibit gate 22 may be assumed to be continuously open as it will be throughout this type of operation.

The flipflop 30 is thrown to its set position (which may be arbitrarily designated as off) indicated at D whenever the flipflop 26 goes on. As already mentioned, whenever the flipflop 30 goes to its set (off) condition the charging of capacitor 38 begins to start the measurement of a set time interval. The running of this interval is indicated by the ramps F, which may be taken to correspond to the potential at the emitter of the unijunction transistor 40. The top of the ramp represents the firing potential, at the time of which the emitter potential drops as indicated at G, and at which time a signal is delivered from its upper base to produce a pulse through the reset connection 48 to produce a transition of the flip-flop 30 to its on condition indicated at E. (In the graph relating to the timer transient conditions are not indicated, being of very short duration and not of significance in the operation involved. The rise of potential is substantially from ground, due to conduction through diode 34 and transistor 32, rising to the firing potential with an initial drop of about three volts and then with a transient delay back to its original potential when the flipflop 30 is reset reestablishing the conductivity through diode 34 and transistor 32.)

It will be noted that the flipflops 26 and 30 are simultaneously on during intervals indicated at H at the bottom of FIGURE 2. When this condition exists inputs are provided at 70 and 74 to the gate 50 resulting in energization of the relay 56 to drive the motor 8 in a direction to impart an opening movement to the valve 4. The result of this is to produce an increase rate of flow which, through the meter, will result in the production of meter pulses at shorter intervals resulting in diminishing of the intervals H during which the motor operates in a valve opening direction. When the interval H becomes quite small (of the order of a few milliseconds) the energization of the relay 56 will become so short that the motor will not operate. This corresponds to a pulse spacing essentially equal to the setting of the time interval produced by the timer. As already indicated, the pulses A may well be spaced by minutes so that the ratio of dead motor time to the pulse interval is negligible, and from a practical standpoint the pulse interval becomes coincident with the set time interval.

If the flow is too fast, the diagram in FIGURE 3 applies. In this figure corresponding events are designated by the same letters as in FIGURE 2 primed, except that the ramp F may be considered the same as before, with the same setting of resistor 36.

The operation now differs from that previously described in that after a time-ramp initiating pulse (flipflop 30 going off) the next pulse turning the flipflop 26 off will occur before the completion G of the set time interval rather than thereafter. The result is that the flipflop 30 is not turned on by a reset pulse until after the flipflop 26 turns off. Accordingly, there occur coincidental off states of the flipflops 26 and 30 during intervals H'. In these intervals the inputs at 72 and 76 to the gate 58 produce an output through the monostable multivibrator 60, the initiation of each output from the gate 58 starting an interval (typically five seconds) so that through the driver 62 by way of the "and" gate 61 the transistor switch 64 is closed energizing relay 66 to produce motor operation in a direction to move the valve F toward closed position to reduce the flow rate. Such operation contains until, as before, the interval between meter pulses becomes substantially equal to the interval set by the timer.

In the foregoing discussion the purpose of the monostable multivibrator 60 and the "and" gate 61 was not brought out, the operation assuming that the interval H' was less than five seconds. The reason for the arrangement shown is the following:

If the setting at 36 in a particular system is for a quite low rate, and the actual flow is too fast, the control would effect closing movement of the valve 4 by the motor 8. If the valve 4 was a type, such as a globe valve, which could cut off flow completely, the corrective action might very well close off the flow entirely, so that no pulses would be emitted, and the control operation would completely fail. To avoid this possibility, the operation of motor 8 should be limited in duration when its operation is in a valve-closing direction. The driver 62, because of the "and" gate 61, will be energized only when the monostable multivibrator 60 is in its astable state and the gate 58 emits a signal. Since the multivibrator 60 has a limited astable period, each operation of the motor will be limited, and typically the astable period may be of the order of about five seconds, which through the connection of the motor to the valve 4 through reduction gearing will not be sufficient under practical conditions to produce complete closing of the valve. A safety situation is thus provided to prevent the possible shutdown of the system as mentioned. Of course, under these circumstances, what is illustrated in FIGURE 3 would be modified to the extent that the time period H' would terminate before the end G of the timer ramp. By what has been described each time period H' would be limited to five seconds, more or less.

The purpose of the inhibit gate is to prevent deenergization of the relay 66 during an initial flow correction. If the controller is set to some low flow rate and the valve 4 is fully open, a train of fast pulses would appear at 20 setting the flip flops 26 and 30 to produce an "and" signal to satisfy the gate 58. Assuming that the control is a long way off equilibrium, the pulses will produce an output train of square pulses. But with inhibit gate 22 in the circuit, the gate 58 will be set and will not be reset until the timer times out. With the monostable multivibrator 60 set for about five seconds, the "and" gate 61 takes care of the condition when the timer times out before the monostable multivibrator has completed its "on" period.

As will be evident from the foregoing, the control system is particularly applicable to the handling of pulses spaced by long intervals such as would correspond to quite low rate of flow through a meter. The corrective drive of a motor is directly compatible with such spaced pulses in that it can operate for adequate periods of the same order of magnitude as the periods between pulses, though as corrective action takes place the intervals of motor operation will become progressively smaller. With minimum periods of motor operation very much less than the periods between pulses there is negligible deviation from the theoretical correspondence of flow with what is set as being desired.

As will be evident, the control system is adapted to the handling of pulses at a much higher frequency than indicated, with corresponding choices of such time intervals as are involved in the timer and in the monostable multivibrator 60; but operation of motors merely in short spurts is not desirable, and if rapidly recurring pulses are provided by a source it is more desirable to provide pulse division as by a divider such as shown at 14 which, if necessary, could be made to divide by much larger factors than the 16 indicated.

It will be evident that the original source of pulses may be any of a great variety of function-to-pulse transducers, so that the original pulses may be at frequencies derived from numerous variables. The control may be of many types of devices other than valves, for example, a motor may drive a current-control rheostat for a furnace in which case a source of pulses might well be a transducer converting temperature into pulse frequency. Or a pressurizing pump may be operated by a controlled motor in response to pulses produced by a pressure-responsive transducer.

Numerous variations in details of the system may be provided without departing from the invention as defined in the following claims.

What is claimed is:

1. In combination, means producing pulses at a repetition rate which is a function of a variable, means controlled by said pulses to start a predetermined time interval upon the occurrence of a first pulse of a pair of such pulses, means responsive to the occurrence of the second of said pair of pulses before the termination of said time interval to produce a first output signal having a duration beginning at the occurrence of the second of said pulses and ending at the end of said time interval, means responsive to the occurrence of the second of said pair of pulses after the termination of said time interval to produce a second output signal having a duration beginning at the end of said time interval and ending on the occurrence of the second of said pulses, and means controlled by said first and second output signals.

2. The combination of claim 1 in which the last mentioned means controls the variable to produce pulses at intervals substantially equal to said predetermined time interval.

3. The combination of claim 1 in which said pulse producing means is a meter measuring a fluid flow, and in which the last mentioned means includes a valve modulating the fluid flow.

4. The combination of claim 2 in which said pulse producing means is a meter measuring a fluid flow, and in which the last mentioned means includes a valve modulating the fluid flow.

References Cited

UNITED STATES PATENTS

| | | | |
|---|---|---|---|
| 2,909,717 | 10/1959 | Hulls et al. | 318—20.310 |
| 3,174,504 | 3/1965 | Rosenbrock et al. | 137—487.5 XR |
| 3,181,403 | 5/1965 | Sterns et al. | 318—162 |
| 3,206,665 | 9/1965 | Burlingham | 318—20.320 XR |
| 3,219,046 | 11/1965 | Waugh | 137—487.5 XR |
| 3,244,863 | 4/1966 | Paterson | 318—20.310 XR |
| 3,264,983 | 8/1966 | Lewis et al. | 318—20.310 XR |
| 3,272,217 | 9/1966 | Young | 137—487.5 XR |

M. CARY NELSON, *Primary Examiner.*

R. P. MILLER, *Assistant Examiner.*